United States Patent
Tanzer (10) Patent No.: US 7,289,860 B1
(45) Date of Patent: Oct. 30, 2007

(54) METHOD AND APPARATUS FOR RESERVING A PROCESSING TOOL IN A SEMICONDUCTOR FABRICATION FACILITY

(75) Inventor: Troy A. Tanzer, Red Rock, TX (US)

(73) Assignee: Advanced Micro Devices, Inc., Austin, TX (US)

( * ) Notice: Subject to any disclaimer, the term of this patent is extended or adjusted under 35 U.S.C. 154(b) by 23 days.

(21) Appl. No.: 11/338,913

(22) Filed: Jan. 25, 2006

(51) Int. Cl.
*G06F 19/00* (2006.01)
(52) U.S. Cl. ............... 700/100; 700/117; 700/121
(58) Field of Classification Search ........... 700/100, 700/117, 121
See application file for complete search history.

(56) References Cited

U.S. PATENT DOCUMENTS

| 6,418,350 | B1 * | 7/2002 | Hamidzadeh et al. ....... 700/100 |
| 6,785,586 | B1 * | 8/2004 | Toprac et al. ............... 700/110 |
| 6,957,114 | B1 * | 10/2005 | Logsdon et al. ............ 700/100 |
| 2001/0011198 | A1 * | 8/2001 | Jevtic ........................ 700/100 |
| 2003/0171972 | A1 * | 9/2003 | Heskin ......................... 705/9 |
| 2006/0030966 | A1 * | 2/2006 | Huang et al. ............... 700/121 |

* cited by examiner

*Primary Examiner*—Kidest Bahta
*Assistant Examiner*—Sheela Rao
(74) *Attorney, Agent, or Firm*—Williams, Morgan & Amerson (57) ABSTRACT

The present invention provides a method, an apparatus, and a system for semiconductor manufacturing. The method includes accessing information indicative of operation of at least one first processing tool. The first processing tool is configured to process at least one wafer. The method also includes determining, prior to processing the wafer by the first processing tool, a first reservation indicative of a time period for processing the wafer in at least one of the first processing tools based on the accessed information.

25 Claims, 4 Drawing Sheets

METHOD AND APPARATUS FOR RESERVING A PROCESSING TOOL IN A SEMICONDUCTOR FABRICATION FACILITY

BACKGROUND OF THE INVENTION

1. Field of the Invention

This invention relates generally to semiconductor fabrication, and, more particularly, to reserving a processing tool in a semiconductor fabrication facility.

2. Description of the Related Art

A semiconductor fabrication facility typically includes numerous processing tools used to fabricate semiconductor devices. The processing tools may include photolithography steppers, etch tools, deposition tools, polishing tools, rapid thermal processing tools, ion implantation tools, and the like. Semiconductor fabrication facilities generally include more than one example of each type of processing tool and each processing tool may include multiple chambers. For example, a semiconductor fabrication facility may include several photolithography steppers, which may include more than one chamber for processing wafers. A semiconductor fabrication facility may also include several etch tools, one or more polishing tools, one or more metrology tools, one or more electrical testing tools, and the like.

Wafers (or wafer lots) are processed in the tools in a predetermined order and each processing tool modifies the wafers according to a particular product design and/or operating recipe so that a desired product is formed in or on the wafer. For example, a photolithography stepper or module may be used to form a patterned layer of photoresist above the wafer. Features in the patterned layer of photoresist correspond to a plurality of features, e.g. gate electrode structures, which will ultimately be formed above the surface of the wafer. Since the semiconductor fabrication facility includes numerous examples of each type of processing tool, the semiconductor fabrication facility may be capable of concurrently processing numerous wafers and/or wafer lots. For example, the semiconductor fabrication facility may concurrently process several wafer lots in parallel by providing the wafer lots to a corresponding number of processing tools, e.g., photolithography steppers and/or chambers therein, which may then process the wafer lots according to an operating recipe associated with the product to be formed in or on the wafer lots.

Once the wafer lots have completed a processing step, they may be provided to one or more processing tools for additional processing. For example, after being processed in one or more photolithography steppers and/or chambers therein, a group of partially processed wafer lots may be provided to a group of etch tools. Each of the partially processed wafer lots may be provided to one of the etch tools based on a scheduling algorithm associated with the etch tools. For example, the scheduling algorithm may determine which of the partially processed wafer lots to provide to each of the etch tools based on priorities associated with the partially processed wafer lots, tool availability, operating recipes associated with the wafer lots, and the like. Conventional scheduling algorithms only assign wafer lots to the associated processing tools when the wafer lots are ready to be processed by the associated processing tools. For example, the scheduling algorithm associated with the etch tools may schedule wafer lots for processing by the etch tools after the wafer lots have completed processing in one or more photolithography steppers.

Scheduling wafer lots for processing by a processing tool in a second group of tools only after processing by a processing tool in a first group of tools has completed may increase cycle times and/or reduce tool utilization. For example, if a tool exception occurs in one of the processing tools in the second group of tools, one or more other tools in the second group of tools may need to be converted to perform the operations that would have been performed by the unavailable processing tool. Furthermore, one or more of the wafer lots may need to be rerouted to other processing tools in the second group of tools. Consequently, the wafer lots that have been processed in the first group of tools may be delayed while these, or other, operations are performed. Accordingly, the cycle time for the processing line including the first and second tool groups may be increased. For another example, additional processing tools may come online, which may permit additional wafer lots to be processed. However, the additional processing tools may be underutilized because the scheduling algorithms associated with processing tools at earlier stages in the processing line may be unaware of the additional processing capacity associated with the additional processing tools.

The independent nature of the various scheduling algorithms may make it difficult to coordinate operations of the processing tool groups to achieve global goals of the semiconductor fabrication facility. For example, the number of each type of product formed by the semiconductor fabrication facility, as well as the deadlines for producing these products, may be determined by forces such as current market demand for each product, shipping commitments made to clients, lot requests by research and development teams, and the like. In a conventional semiconductor fabrication facility, engineers manually configure the various scheduling algorithms and associated processing tools to attempt to meet the global goals. This process is time-consuming, may reduce the efficiency of the semiconductor fabrication facility, and is not always successful. Furthermore, if any of the forces that determine the global goals should change, the various scheduling algorithms must be manually reconfigured to attempt to meet the changing goals.

The present invention is directed to addressing the effects of one or more of the problems set forth above.

SUMMARY OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

In one embodiment of the present invention, a method is provided for semiconductor manufacturing. The method includes accessing information indicative of operation of at least one first processing tool. The first processing tool is configured to process at least one wafer. The method also includes determining, prior to processing the wafer by the first processing tool, a first reservation indicative of a time period for processing the wafer in at least one of the first processing tools based on the accessed information.

In another embodiment of the present invention, a system is provided for semiconductor manufacturing. The system includes at least one first processing tool configured to process at least one wafer and at least one second processing tool configured to process said at least one wafer after said at least one wafer is processed by said at least one first processing tool. The system also includes a scheduling module configured to access information indicative of operation of the at least one first processing tool and the at least one second processing tool. The scheduling module is also configured to determine, prior to completion of processing of the at least one wafer by the at least one first processing tool, a first reservation indicative of a time period for processing the at least one wafer in the at least one second processing tool based on the accessed information.

BRIEF DESCRIPTION OF THE DRAWINGS

The invention may be understood by reference to the following description taken in conjunction with the accompanying drawings, in which like reference numerals identify like elements, and in which.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Portions of the present invention and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The invention is not limited by these aspects of any given implementation.

The present invention will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the present invention. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 1:
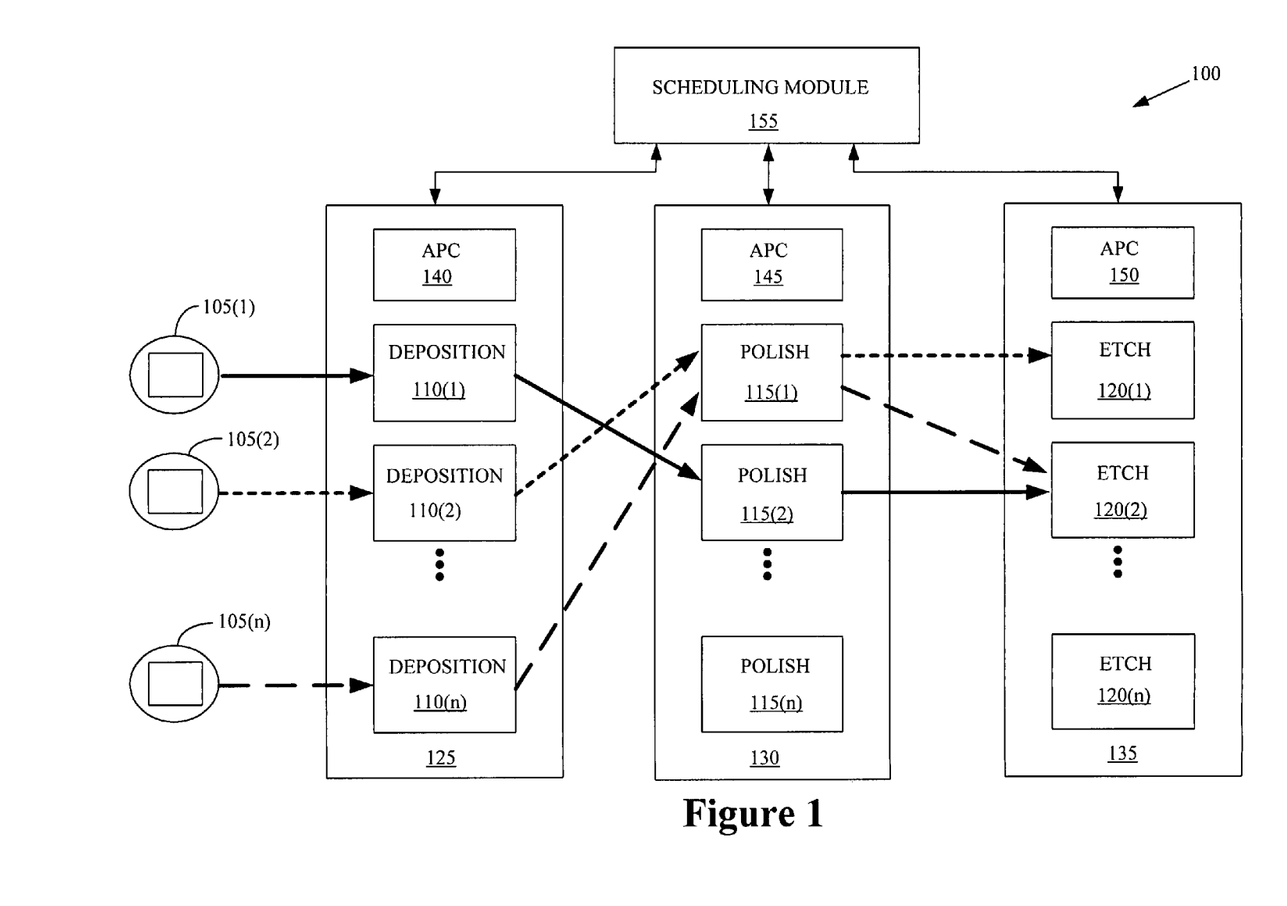
FIG. 1 conceptually illustrates a first exemplary embodiment of a manufacturing system, in accordance with the present invention.

FIG. 1 conceptually illustrates a first exemplary embodiment of a manufacturing system 100. Although the invention is described as it may be implemented in a semiconductor device fabrication facility, the invention is not so limited and may be applied to other manufacturing environments. In the illustrated embodiment, the manufacturing system 100 is configured to fabricate semiconductor devices in or on one or more wafers 105(1-n). Hereinafter, the indices (1-n) may be used to indicate individual wafers 105(1), 105(2), . . . , 105(n) or subsets thereof. However, the indices (1-n) may be dropped when referring to the wafers 105 collectively. The same convention may also be applied to other groups of elements that are referred to by a numeral and a distinguishing index. The particular type of semiconductor devices, or products, formed in or on the wafers 105 are not material to the present invention and, in various embodiments, may include any type of product. In various alternative embodiments, the techniques described herein may be applied to a variety of workpieces or manufactured items to form products including, but not limited to, microprocessors, memory devices, digital signal processors, application specific integrated circuits (ASICs), or other similar devices. The techniques may also be applied to workpieces or manufactured items other than semiconductor devices. Persons of ordinary skill in the art having benefit of the present disclosure should appreciate that, in various embodiments, the wafers 105 may represent individual wafers, multiple wafers, one or more wafer lots, or any other number and/or grouping of wafers.

The manufacturing system 100 includes processing tools 110, 115, 120 that may be used to form one or more products, or portions thereof, in or on the wafers 105. In the illustrated embodiment, the processing tools include deposition tools 110, polishing tools 115, and etch tools 120. However, persons of ordinary skill in the art having benefit of the present disclosure should appreciate that the processing tools 110, 115, 120 are intended to be illustrative and not to limit the present invention. In various alternative embodiments, the manufacturing system 100 may include any number of processing tools of any type, including lithography tools, annealing tools, implantation tools, and the like. Although not shown in the illustrated embodiment, the manufacturing system 100 may also include one or more metrology tools such as scatterometers, ellipsometers, scanning electron microscopes, and the like. Techniques for operating the processing tools 110, 115, 120 and/or metrology tools are known in the art and, in the interest of clarity, only those aspects of the operation of these devices that are relevant to the present invention will be discussed further herein.

In the illustrated embodiment, the processing tools 110, 115, 120 are associated with corresponding tool groups 125, 130, 135. Each of the tool groups 125, 130, 135 may include an associated control unit, such as an advanced process control (APC) unit 140, 145, 150. For example, the APC units may be implemented in an Advanced Process Control (APC) Framework, such as a Catalyst system formerly offered by KLA Tencor, Inc. The Catalyst system uses Semiconductor Equipment and Materials International (SEMI) Computer Integrated Manufacturing (CIM) Framework compliant system technologies, and is based on the Advanced Process Control (APC) Framework. CIM (SEMI E81-0699 - Provisional Specification for CIM Framework Domain Architecture) and APC (SEMI E93-0999 - Provisional Specification for CIM Framework Advanced Process Control Component) specifications are publicly available from SEMI. The APC framework is a preferred platform from which to implement the control strategy taught by the present invention. In some embodiments, the APC framework can be a factory-wide software system; therefore, the control strategies taught by the present invention can be applied to virtually any of the semiconductor manufacturing tools on the factory floor. The APC framework also allows for remote access and monitoring of the process performance.

The manufacturing system 100 includes a scheduling module 155. Persons of ordinary skill in the art should appreciate that the scheduling module 155 may be implemented in any combination of hardware, firmware, and/or software. In the illustrated embodiment, the scheduling module 155 receives information from the processing tools 110, 115, 120. For example, the APC control units 140, 145, 150 may monitor the associated processing tools 110, 115, 120 and collect information associated with these tools. Exemplary information may include information indicative of processing times associated with the processing tools 110, 115, 120, process durations for processing one or more wafers 105 in the processing tools 110, 115, 120, information indicating whether or not one or more of the processing tools 110, 115, 120 is available, operating recipes that may be used by one or more of the processing tools 110, 115, 120, information indicating tool performance levels (or metrics) associated with one or more of the processing tools 110, 115, 120, and the like. The APC control units 140, 145, 150 may then provide this information to the scheduling module 155, e.g. in response to a request from a scheduling module 155 to access the information collected by the APC control units 140, 145, 150.

In one embodiment, the scheduling module 155 may be able to access information indicative of one or more global goals associated with the manufacturing system 100. Exemplary global goals may include the number of each type of product formed by the semiconductor fabrication facility, the deadlines for producing these products, and the like. The global goals may be determined by forces such as current market demand for each product, shipping commitments made to clients, lot requests by research and development teams, and the like. Accordingly, the information indicative of the global goals may include information indicating current market demand, shipping commitments, lot requests, and the like. The information indicative of the global goals may be provided to the scheduling module 155 in any form. For example, the scheduling module 155 may access information indicative of the global goals by accessing one or more memory locations and/or registers. Alternatively, the information may be manually input to the scheduling module 155 by plant personnel.

The scheduling module 155 may use the accessed information to determine one or more reservations that indicate a time period (or time slot) for processing one or more of the wafers 105 in one or more of the processing tools 110, 115, 120. For example, the accessed information may indicate that the deposition tools 110(1-$n$), the polish tools 115(1-2), and the etch tools 120(1-2) are available for processing. The accessed information may also indicate that the polish tool 115($n$) and/or the etch tool 120($n$) are not available for processing. The scheduling module 155 may then form reservations indicating that the wafer 105(1) is scheduled to be processed in the deposition tool 110(1) during a first time slot, the polish tool 115(2) during a second time slot that follows the first time slot, and the etch tool 120(2) during a third time slot that follows the second time slot. The path through the manufacturing system corresponding to the reservations for the wafer 105(1) is indicated by the solid arrows. The scheduling module 155 may also form reservations indicating that the wafer 105(2) is scheduled to be processed in the deposition tool 110(2), the polish tool 115(1), and the etch tool 120(1). The path through the manufacturing system corresponding to the reservations for the wafer 105(2) is indicated by the short-dashed arrows. The scheduling module 155 may also form reservations indicating that the wafer 105($n$) is scheduled to be processed in the deposition tool 110($n$), the polish tool 115(1), and the etch tool 120(2). The path through the manufacturing system corresponding to the reservations for the wafer 105($n$) is indicated by the long-dashed arrows.

In one embodiment, the scheduling module 155 may determine reservations for the wafers 105 prior to processing the wafers using the processing tools 110, 115, 120. For example, the scheduling module 155 may determine reservations for the wafers 105 as part of an initialization process associated with processing of the wafers 105. However, the present invention is not limited to determining reservations as part of an initialization process that takes place prior to any processing by the processing tools 110, 115, 120. In alternative embodiments, the scheduling module 155 may determine reservations for the wafers 105 at any point before or during the processing of the wafers 105. For example, the scheduling module 155 may determine one or more reservations associated with one or more of the wafers 105 after the wafers 105 have been processed by a portion of the processing tools 110, 115, 120 but before the wafers 105 are processed by one or more of the processing tools 110, 115, 120 indicated in the reservation.

The time slots allocated to each wafer 105 for processing in the processing tools 110, 115, 120 may or may not overlap. For example, the time slots reserved for processing the wafer 105(1) in the deposition tool 110(1) may be concurrent with the time slots reserved for processing the wafer 105(2) in the deposition tool 110(2). For another example, the time slots reserved for processing the wafer 105(2) in the polish tool 115(1) may not be concurrent with the time slots reserved for processing the wafer 105($n$) in the polish tool 115(1). However, in some embodiments, one or more of the processing tools 110, 115, 120 may include multiple chambers so that time slots reserved for processing multiple wafers 105 in one or more of the processing tools 110, 115, 120 may be concurrent. The reservation may therefore also indicate the chamber of the processing tool 110, 115, 120 that is to be used to process the wafer 105.

The scheduling module 155 may also modify one or more of the reservations before the wafer 105 has been processed by the processing tool 110, 115, 120 associated with the reservation. For example, the scheduling module 155 may modify reservations associated with one or more wafers 105 after the wafers have been processed by one of the deposition tools 110, but before the wafers 105 have been processed by one of the polish tools 115 and/or the etch tools 120. In other embodiments, the scheduling module 155 may modify the reservations based on changes in the internal and/or external environment associated with the manufacturing system 100. For example, the scheduling module 155 may detect changes in the information associated with the processing tools 110, 115, 120 and may modify the reservations based on the detected changes. For another example, the scheduling module 155 may detect one or more tool exceptions and may modify the reservations accordingly. For yet another example, the scheduling module 155 may modify one or more reservations based on changes in the global goals associated with the manufacturing system 100. Modifications to the reservations associated with one or more of the wafers 105 may result in conflicts with other previously determined reservations and/or may free up time slots associated with one or more of the processing tools 110, 115, 120, in which case the scheduling module 155 may modify one or more reservations to resolve the conflicts or to take advantage of the newly available time slots on the processing tools 110, 115, 120.

Figure 2:
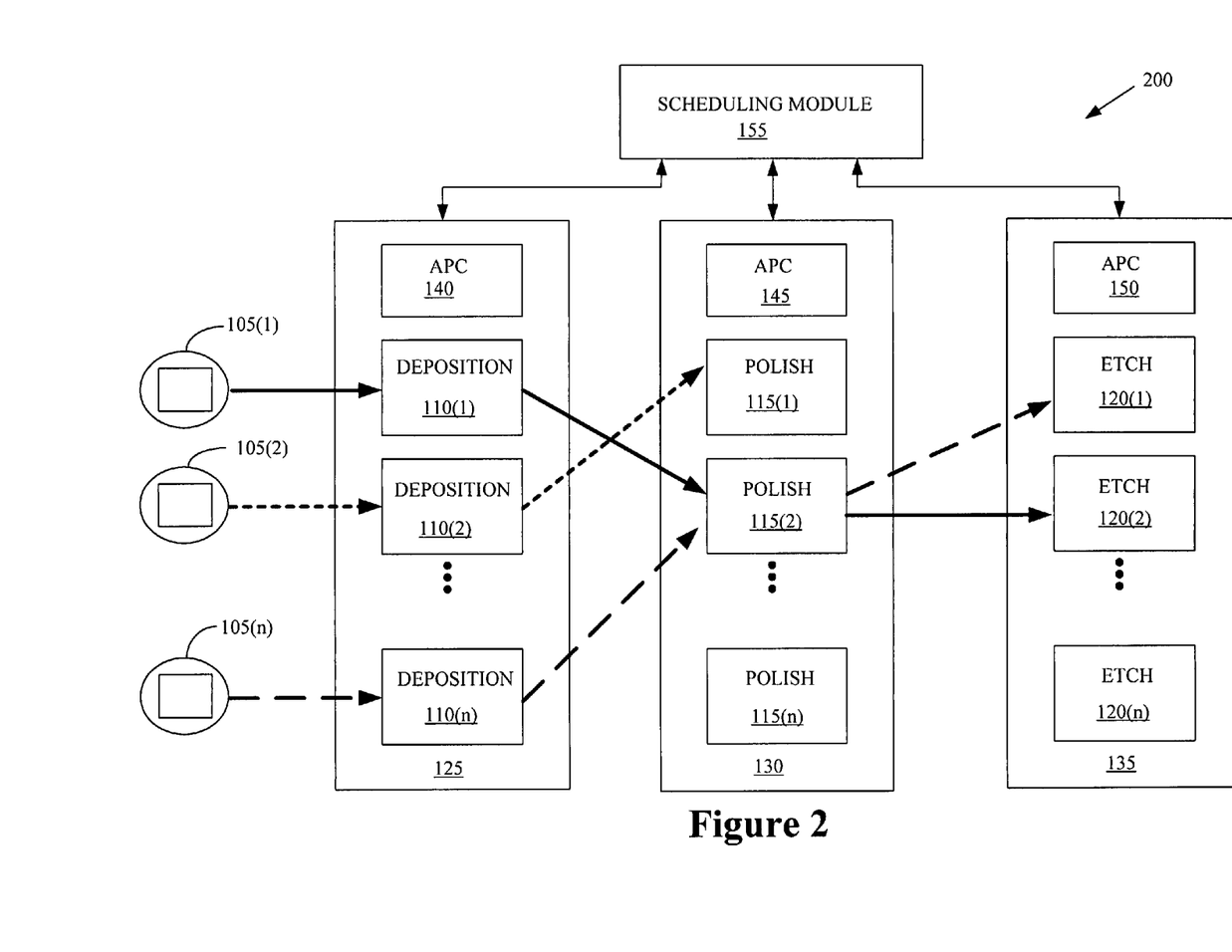
FIG. 2 conceptually illustrates a second exemplary embodiment of a manufacturing system, in accordance with the present invention.

FIG. 2 conceptually illustrates a second exemplary embodiment of a manufacturing system 200. In the second exemplary embodiment, the reservations associated with the wafer 105($n$) have been modified relative to the reservations depicted in the first exemplary embodiment shown in FIG. 1 so that the reservations indicate that the wafer 105($n$) is to be processed in one or more reserved time slots on the polishing tool 115(2), as indicated by the long-dashed arrows. The scheduling module 155 may modify the reservations based on any criteria associated with the processing. For example, if the wafer 105(2) is subject to a lot hold while being processed by the polishing tool 115(1), the scheduling module 155 may modify the reservations associated with the wafer 105($n$) to redirect the wafer 105($n$) to the polishing tool 115(2), which may improve tool utilization and/or reduce cycle times in the manufacturing system 200. For another example, the polishing tool 115($n$) may experience a tool exception and/or a change in a tool performance metric, which may cause the scheduling module 155 to modify the reservations.

The scheduling module 155 may also modify reservations associated with processing tools in response to changes in reservations associated with other wafers 105. In the illustrated embodiment, the reservation indicating that the wafer 105(2) is to be processed on the etch tool 120(1) has been canceled, e.g. because of the lot hold on the wafer 105(2). Accordingly, the scheduling module 155 may modify the reservation associated with the wafer 105($n$) to indicate that the wafer 105($n$) is to be processed using the etch tool 120(1). Modifying the reservation so that the wafer 105($n$) is sent to the potentially idle etch tool 120(1) may improve tool utilization and/or reduce cycle times in the manufacturing system 200.

Figure 3:
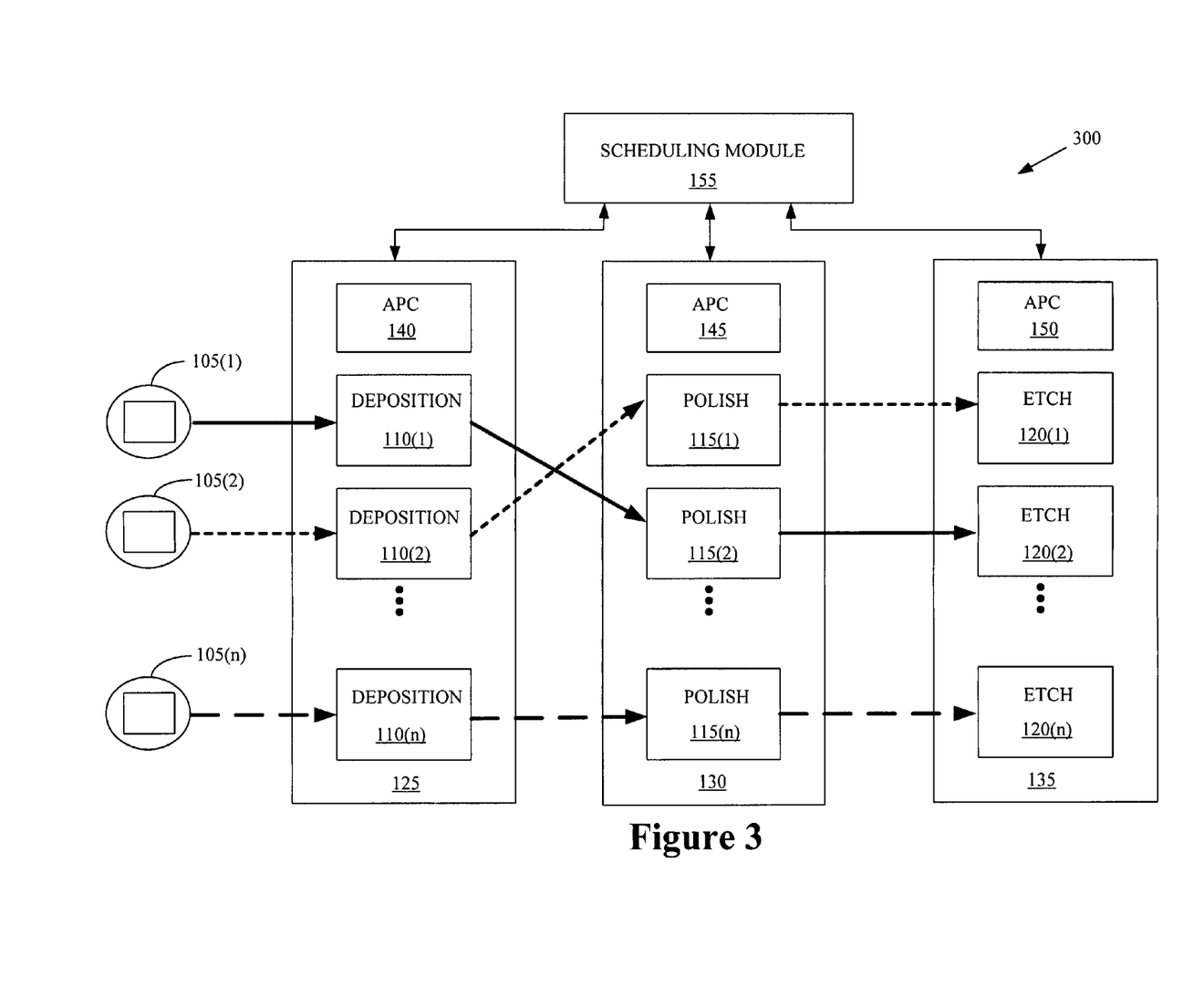
FIG. 3 conceptually illustrates a third exemplary embodiment of a manufacturing system, in accordance with the present invention.

FIG. 3 conceptually illustrates a third exemplary embodiment of a manufacturing system 300. In the third exemplary embodiment the polish tool 115($n$) and the etch tool 120($n$) are available for processing wafers 105. For example, the polish tool 115($n$) and/or the etch tool 120($n$) may have been unavailable because of a tool exception, routine maintenance, a lot hold, a change in a tool performance metric indicating deteriorating performance of the tool, or for some other reason. However, the reason for the unavailability may have been resolved and so the polish tool 115($n$) and/or the etch tool 120($n$) may now be available for processing. For another example, the polish tool 115($n$) and/or the etch tool 120($n$) may have been configured to form a product that was not the same as the product intended to be formed on the wafers 105. In this case, the polish tool 115($n$) and/or the etch tool 120($n$) may become available for processing the wafers 105 following reconfiguration of the polish tool 115($n$) and/or the etch tool. Alternatively, a change in one or more global goals may change the product intended to be formed on the wafers 105, in which case the polish tool 115($n$) and/or the etch tool 120($n$) may become available for processing the wafers 105.

The scheduling module 155 may receive information indicating present or future availability of the polish tool 115($n$) and/or the etch tool 120($n$). For example, one or more of the APC units 140, 145, 150 may provide information indicating availability of the polish tool 115($n$) and/or the etch tool 120($n$). The scheduling module 155 may then modify one or more reservations associated with one or more of the wafers based upon the information indicating availability of the polish tool 115($n$) and/or the etch tool 120($n$). In the third exemplary embodiment, the scheduling module 155 modifies reservations associated with the wafer 105($n$) so that the reservations indicate that the wafer 105($n$) should be processed in reserved time slots on the polish tool 115($n$) and the etch tool 120($n$). Modifying the reservation so that the wafer 105($n$) is sent to the available polish tool 115($n$) and/or the available etch tool 120($n$) may improve tool utilization and/or reduce cycle times in the manufacturing system 200.

Figure 4:
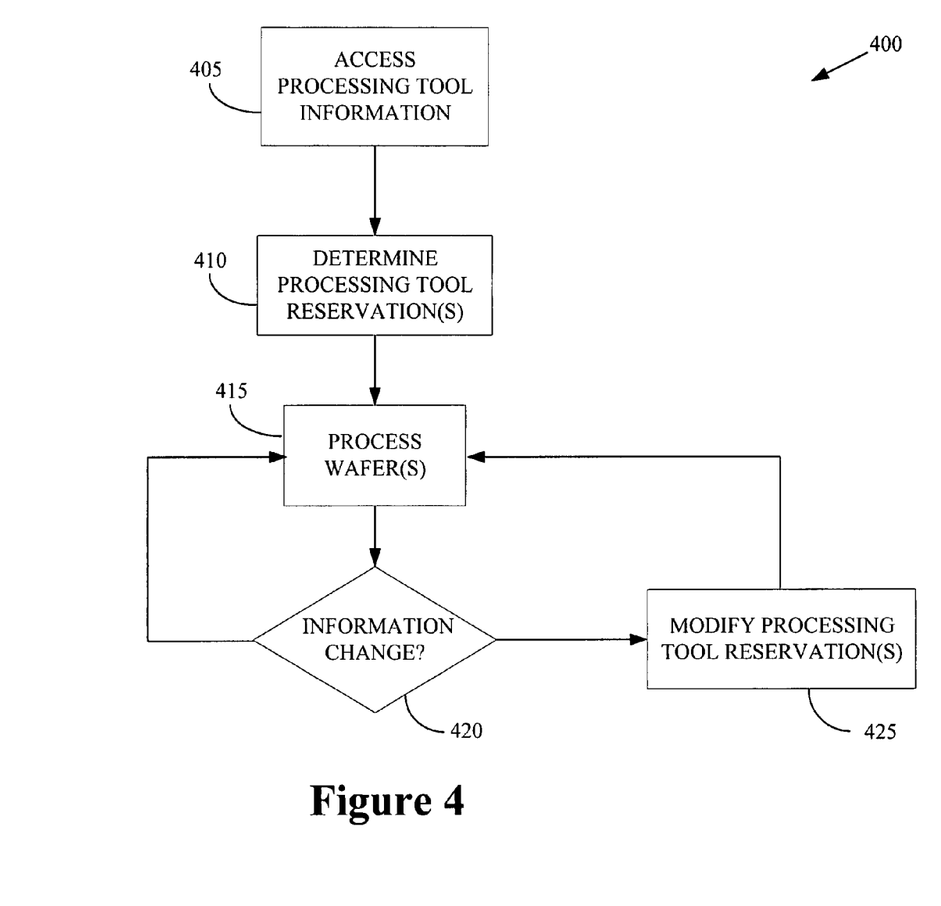
FIG. 4 conceptually illustrates one exemplary embodiment of a method of forming reservations in a semiconductor manufacturing facility, in accordance with the present invention.

FIG. 4 conceptually illustrates one exemplary embodiment of a method 400 of forming reservations in a semiconductor manufacturing facility, such as the exemplary embodiments of the manufacturing systems 100, 200, 300 discussed above and depicted in FIGS. 1, 2, and 3. In the illustrated embodiment, information associated with processing tools in a semiconductor manufacturing facility is accessed (at 405). As discussed above, the information associated with the processing tools may include information indicating a processing time, a duration of a process, present or future tool availability, tool performance, an operating recipe, a global goal, and the like. One or more reservations associated with one or more wafers and one or more corresponding processing tools may then be determined (at 410) based on the access information associated with the processing tools. In one embodiment, the reservations may be determined (at 410) prior to commencing processing of the wafers.

One or more of the wafers may then be processed (at 415) in accordance with one or more of the reservations. For example, wafers may be provided to processing tools in the time slots indicated by the reservations. During processing, information associated with the processing tools may be monitored. The wafers may continue to be processed (at 415) if no change (or a change within a predetermined tolerance) is detected (at 420). However, if a change in some portion of the information is detected (at 420) then one or more of the processing tool reservations may be modified (at 425). For example, reservations associated with future processing of a partially processed wafer may be modified (at 425) in response to detecting (at 420) a change in information associated with one or more of the processing tools.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A semiconductor manufacturing method, comprising:
    accessing information indicative of operation of a plurality of processing tools, said plurality of processing tools configured to process at least one wafer;
    determining, prior to processing said at least one wafer by said plurality of processing tools, a first plurality of reservations indicative of a plurality of time periods for processing said at least one wafer in a first subset of said plurality of processing tools based on the accessed information.

2. The method of claim 1, wherein accessing the information indicative of operation of said plurality of processing tools comprises accessing at least one of a processing time, a process duration, an indication of tool availability, an operating recipe, a global goal, and an indication of tool performance associated with said plurality of processing tools.

3. The method of claim 1, wherein determining the first plurality of reservations comprises determining a first plurality of reservations indicative of a path taken by said at least one wafer during processing of said at least one wafer by the first subset of the plurality of processing tools.

4. The method of claim 3, wherein determining the first plurality of reservations comprises modifying the first plurality of reservations to indicate a different path taken by said at least one wafer.

5. The method of claim 4, wherein modifying the first plurality of reservations comprises modifying the first plurality of reservations in response to detecting a change in the information indicative of operation of said plurality of processing tools.

6. The method of claim 4, wherein modifying the first plurality of reservations comprises modifying the first plurality of reservations in response to detecting a tool exception associated with said plurality of processing tools.

7. The method of claim 4, wherein modifying the first plurality of reservations comprises modifying the first plurality of reservations to indicate at least one of a different time period for processing said at least one wafer or a different subset of the plurality of processing tools.

8. The method of claim 4, wherein modifying the first plurality of reservations comprises modifying the first plurality of reservations in response to a change in a reservation associated with at least one wafer different than said at least one wafer.

9. The method of claim 1, comprising determining at least one second reservation indicative of at least one time period for processing said at least one wafer in at least one second subset of the plurality of processing tools.

10. The method of claim 9, wherein determining the second reservation comprises determining the second reservation prior to processing said at least one wafer by said at least one second subset of the plurality of processing tools.

11. The method of claim 9, further comprising modifying said at least one second reservation.

12. The method of claim 11, wherein modifying said at least one second reservation comprises modifying said at least one second reservation in response to detecting a tool exception associated with at least one of the first and second subsets of the plurality of processing tools or detecting a change in a reservation associated with at least one wafer different than said at least one wafer.

13. A semiconductor manufacturing apparatus, comprising:
    means for accessing information indicative of operation of a plurality of processing tools, said plurality of processing tools configured to process at least one wafer;
    means for determining, prior to processing said at least one wafer by said plurality of processing tools, a first plurality of reservations indicative of a plurality of time periods for processing said at least one wafer in a first subset of said plurality of processing tools based on the accessed information.

14. A system for semiconductor manufacturing, comprising:
    a plurality of processing tools configured to process at least one wafer; and
    a scheduling module configured to:
        access information indicative of operation of said plurality of processing tools; and
        determine, prior to processing said at least one wafer by said plurality of processing tools, a first plurality of reservations indicative of a plurality of time periods for processing said at least one wafer in a first subset of said plurality of processing tools based on the accessed information.

15. The system of claim 14, wherein the scheduling module is configured to access at least one of a processing time, a process duration, an indication of tool availability, an operating recipe, a global goal, and an indication of tool performance associated with said plurality of processing tools.

16. The system of claim 14, wherein the scheduling module is configured to determine a first plurality of reservations indicative of a path taken by said at least one wafer during processing of said at least one wafer by the first subset of the plurality of processing tools.

17. The system of claim 16, wherein the scheduling module is configured to modify the first plurality of reservations to indicate a different path taken by said at least one wafer.

18. The system of claim 17, wherein the scheduling module is configured to modify the first plurality of reservations in response to detecting a change in the information indicative of operation of said plurality of processing tools.

19. The system of claim 17, wherein the scheduling module is configured to modify the first plurality of reservations in response to detecting a tool exception associated with said plurality of processing tools.

20. The system of claim 17, wherein the scheduling module is configured to modify the first plurality of reservations to indicate at least one of a different time period for processing said at least one wafer or a different subset of the plurality of processing tools.

21. The system of claim 17, wherein the scheduling module is configured to modify the first plurality of reservations in response to a change in a reservation associated with at least one wafer different than said at least one wafer.

22. The system of claim 14, wherein the scheduling module is configured to determine at least one second reservation indicative of at least one time period for processing said at least one wafer in at least one second subset of the plurality of processing tools.

23. The system of claim 22, wherein the scheduling module is configured to determine said at least one second reservation prior to processing said at least one wafer by said at least one second subset of the plurality of processing tools.

24. The system of claim 22, wherein the scheduling module is configured to modify said at least one second reservation.

25. The system of claim 24, wherein the scheduling module is configured to modify said at least one second reservation in response to detecting a tool exception associated with at least one of the first and second subsets of processing tools or detecting a change in a reservation associated with at least one wafer different than said at least one wafer.

* * * * *